US008910885B2

(12) United States Patent
Saxton et al.

(10) Patent No.: US 8,910,885 B2
(45) Date of Patent: Dec. 16, 2014

(54) HIGH PRESSURE WASHER APPARATUS AND CART

(76) Inventors: Christopher Saxton, Plymouth, MI (US); Ron Haarer, Farmington Hills, MI (US); Charles Riley, Grosse Pointe Park, MI (US)

(*) Notice: Subject to any disclaimer, the term of this patent is extended or adjusted under 35 U.S.C. 154(b) by 367 days.

(21) Appl. No.: 13/506,377

(22) Filed: Apr. 16, 2012

(65) Prior Publication Data

US 2013/0270359 A1  Oct. 17, 2013

(51) Int. Cl.
*B05B 9/00* (2006.01)
*B05B 7/00* (2006.01)
(52) U.S. Cl.
CPC ................... *B05B 7/0093* (2013.01)
USPC ............ 239/147; 239/146; 239/525; 239/526
(58) Field of Classification Search
USPC .......... 239/146, 722, 525, 532, 391; 72/379.2
See application file for complete search history.

(56) References Cited

U.S. PATENT DOCUMENTS

| | | | | |
|---|---|---|---|---|
| 4,638,948 A | * | 1/1987 | Marlek | 239/722 |
| 4,848,659 A | * | 7/1989 | Tadych | 239/127 |
| 4,889,360 A | * | 12/1989 | Havlovitz | 280/655.1 |
| 5,299,767 A | | 4/1994 | Simpson | |
| 6,139,029 A | * | 10/2000 | Shaw | 280/8 |
| D499,848 S | | 12/2004 | Leasure | |
| 7,926,740 B2 | | 4/2011 | Parris et al. | |
| 2006/0071436 A1 | * | 4/2006 | O'Connor | 280/47.29 |
| 2010/0108781 A1 | | 5/2010 | Terrizzi et al. | |

OTHER PUBLICATIONS

Machine Translation of JP2002146277 (Kato et al.).*

* cited by examiner

*Primary Examiner* — Ryan Reis
*Assistant Examiner* — Juan C Barrera
(74) *Attorney, Agent, or Firm* — Alex Rhodes

(57) ABSTRACT

A high pressure washer apparatus in combination with a lightweight fastenerless cart. The cart is characterized by a rigid structure which essentially consists of a continuous folded aluminum plate having a horizontal platform wall portion for supporting said washer apparatus; downward extending side wall portions; an upward extending front wall portion and an upward extending rear wall portion. A telescoping handle is mounted on the rear wall portion for pushing, pulling, and lifting the pressure washer apparatus. Accessories, mounted in "built-in" provisions are readily available to an operator of the pressure washer apparatus.

13 Claims, 6 Drawing Sheets

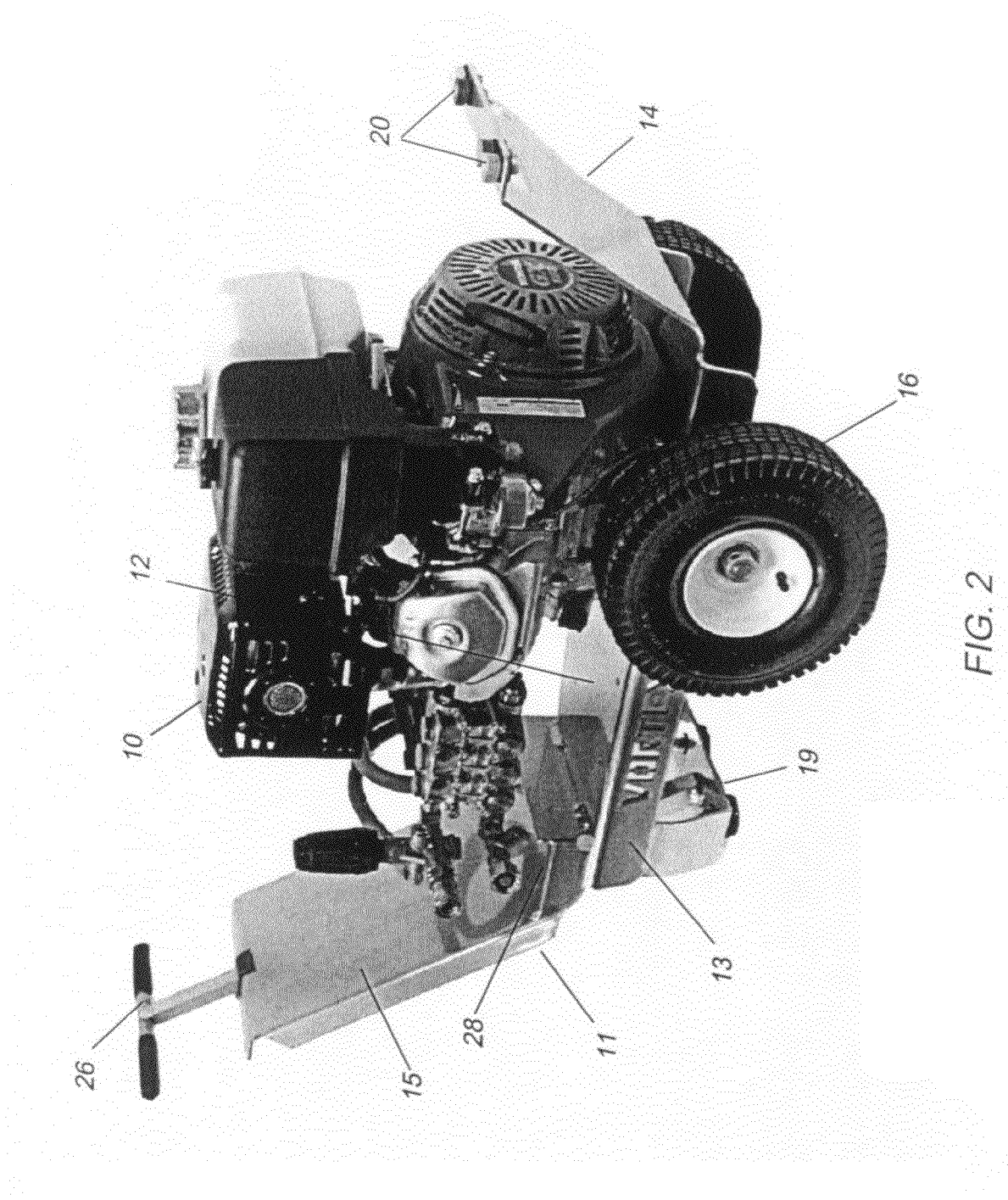

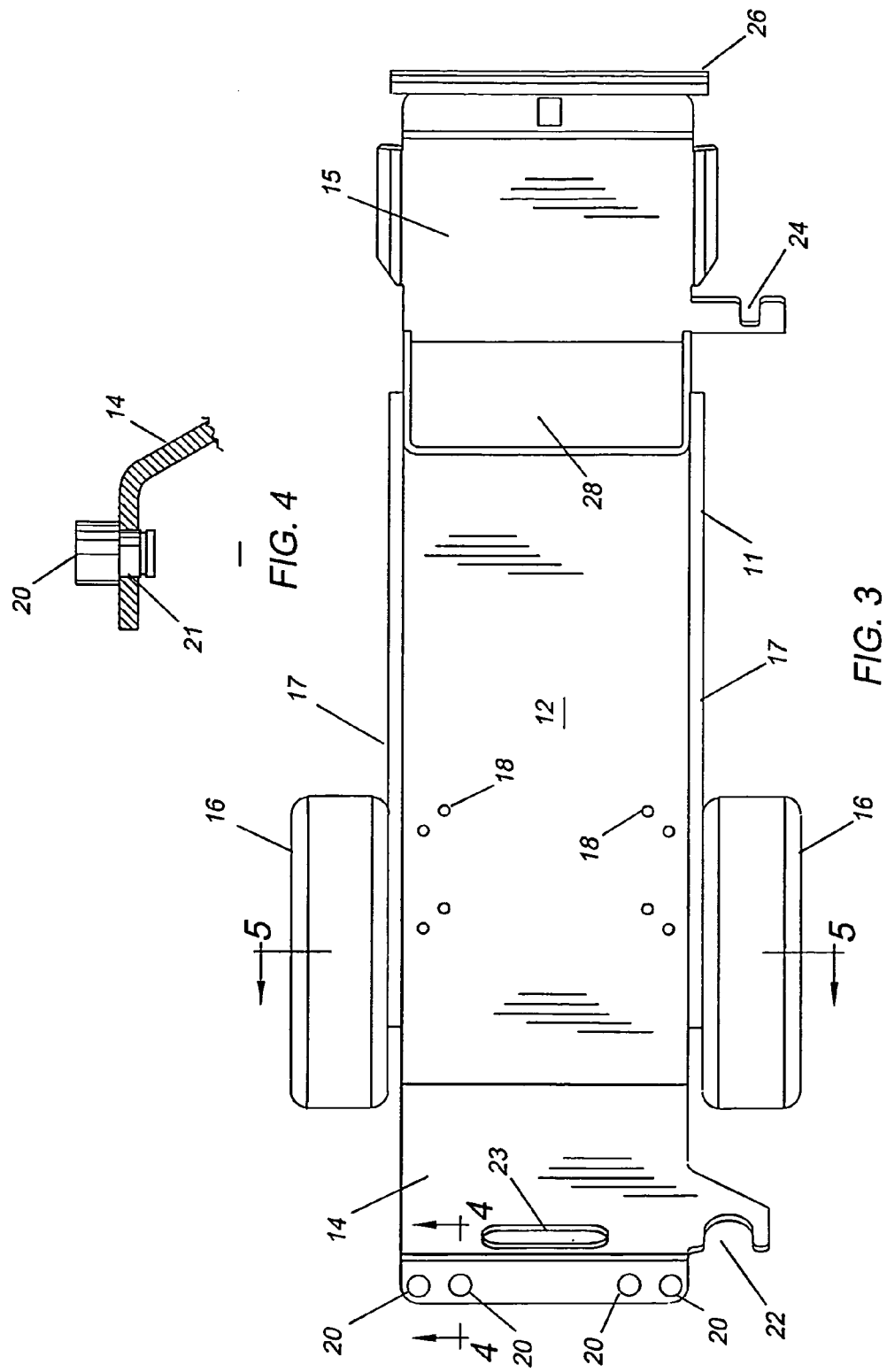

HIGH PRESSURE WASHER APPARATUS AND CART

FIELD OF THE INVENTION

This invention relates to portable high pressure washer systems, and more particularly to a lightweight portable pressure washer apparatus and cart.

BACKGROUND OF THE INVENTION

High pressure washers are popular with homeowners for cleaning barbeque grilles, concrete floors, patios, swimming pools, and wooden decks. They are very handy for cleaning tough grit and grime from objects, such as barbeque grilles and concrete floors. Commercial units are used by contractors for cleaning home siding, tennis courts and gutters and preparing surfaces for painting, etc.

A typical portable pressure washer system includes a cart, an engine, a high pressure pump, and a low pressure water source, such as a garden hose. Accessories, such as wands and nozzle tips may be carried on the cart or separately. The discharge of water is controlled by the sizes of the nozzle tips and a trigger on the wand.

The pumps and engines are mounted on the cart which is carried on a pair of wheels. They are pushed and/or pulled by an operator and are transported from location to location in vans, pick-up trucks and trunks of passenger vehicles. The carts are multi-piece assemblies consisting of tubular and sheet steel members, brackets and hooks held together by welds and threaded fasteners. When handles are provided, they are either welded or held to carts with threaded fasteners.

There are numerous shortcomings with current pressure washer systems. Some are heavy and difficult to lift or move. All have threaded fasteners that loosen over time. Many are not protected against impact forces.

U.S. Pat. Nos. 7,926,740; D499,848; 5,299,767; and US Application No. 2010/0108781 are exemplary of pressure power washers in the prior art. All of the references have multi-piece carts. None of the carts are fastenerless or have telescopic handles. Spray wands, hoses and auxiliary nozzle tips are carried on brackets, hooks and clamps.

SUMMARY OF THE INVENTION

With the above shortcomings in mind, a lightweight pressure washer apparatus is provided that is comprised of an engine and high pressure pump in combination with a fastenerless cart made of a folded laser cut aluminum plate with a cradle and telescoping handle for pushing, pulling and lifting the washer apparatus. Nozzle tips, a spray wand and a hose are carried without brackets, hooks and clamps.

One characterizing feature of the invention is the folded laser cut powder coated aluminum plate. Another characterizing feature is a the telescoping T-handle. Another characterizing feature is the lack of fasteners, brackets, hooks and clamps. These features provide a cart having a distinct appearance and a number of benefits over existing carts. One benefit is a rigid structure that protects the engine and pump against damage from impact forces.

Another benefit is that the folded structure can be made from existing machines and simple tooling, such as programmable laser (CNC) laser routers, power shears, press brakes and forming dies. Another benefit is that the aluminum plate is a continuous plate which protects the undersides of the engine and pump from contamination by water, mud and debris, such as sand, rocks, tar and gravel. Another benefit is its high resistance to corrosion. Still yet another feature is the telescopic T-handle which can be retracted for storage and extended accommodates differences in operator height.

In employing the teaching of the present invention, a plurality of alternate constructions can be provided to achieve the desired results and capabilities. In this disclosure, only two embodiments are presented for the purpose of disclosing our invention. However, these embodiments are intended as examples only and should not be considered as limiting the scope of our invention.

The foregoing benefits together with the best mode of practicing the invention and additional benefits and features will become apparent from the ensuing detailed description of a preferred embodiment. The subject matter in which exclusive property rights are claimed is set forth in the numbered claims which are appended to the detailed description of a preferred embodiment.

BRIEF DESCRIPTION OF THE DRAWINGS

The invention will be better understood and further objects, characterizing features, details and advantages thereof will appear more clearly with reference to the diagrammatic drawings illustrating a specific embodiment of the invention by way of non-limiting example only.

FIG. 2 is a perspective view, showing the front and right sides of the portable lightweight pressure washer and cart.

FIG. 3 is a plan view of the cart.

FIG. 4 is a cross-sectional view taken on the line 4-4 in FIG. 3.

DETAILED DESCRIPTION OF A PREFERRED EMBODIMENT

Figure 1:
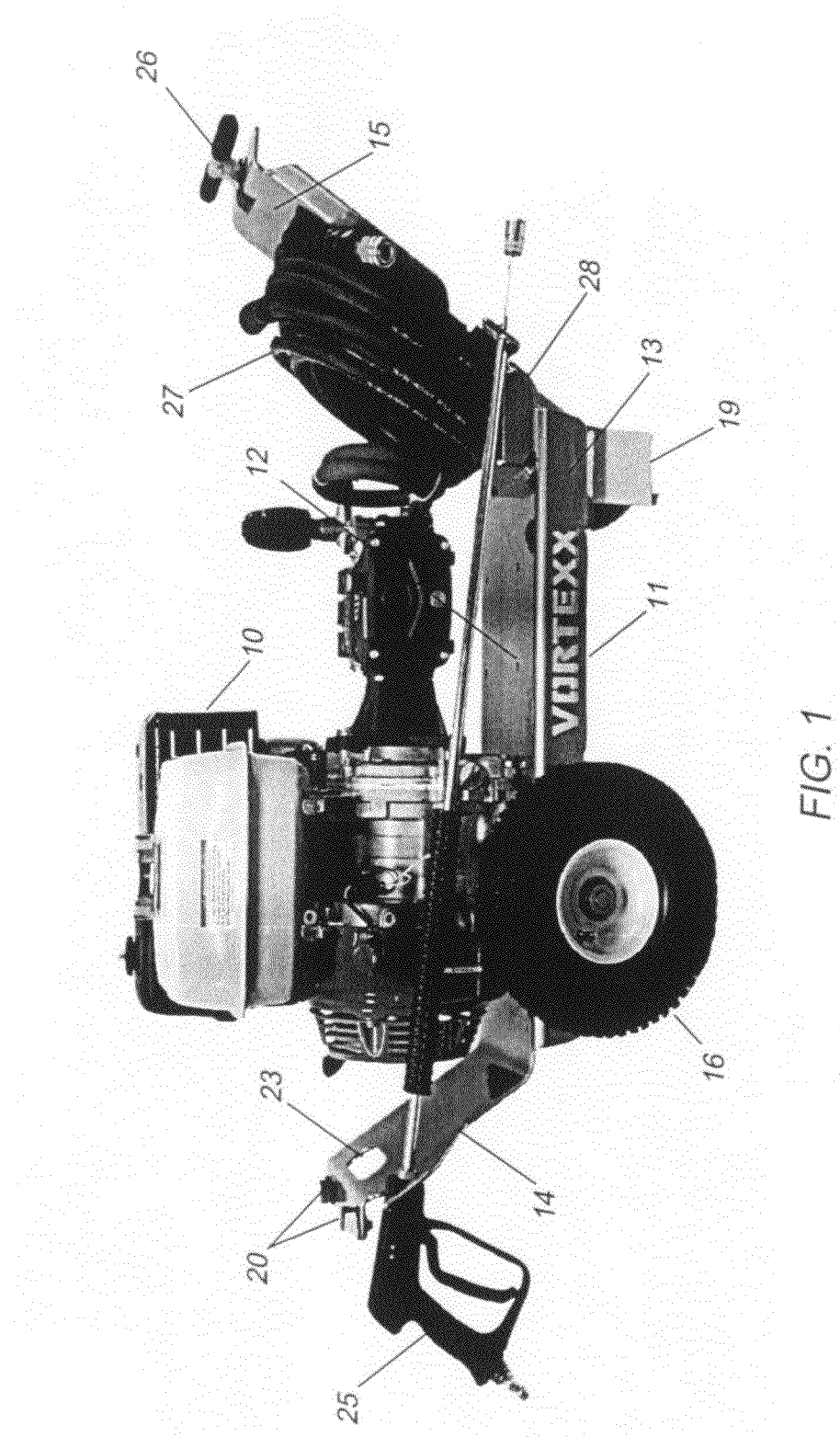
FIG. 1 is a left side elevation view of a portable lightweight pressure washer and cart according to the present invention.

Referring now to the drawings wherein like numerals designate like and corresponding parts throughout the several views, in FIGS. 1 through 3, inclusive, a pressure washer apparatus 10 and cart 11 are shown according to our invention. One characterizing feature of our invention is the novel construction of the cart 11. The cart is 11 a unitary structure that essentially consists of a continuous folded structure, formed from a lightweight aluminum plate. The efficient construction results in a combined 4000 PSI washer and cart which weighs only 119 pounds. The cart is powder coated to resist corrosion.

Another benefit of the folded structure is that it can be made with existing machines and low cost tools such as CNC laser routers, forming dies and press brakes. This reduces preproduction times and investment costs. Still yet another benefit is that the nuts, bolts, rivets, other fasteners and brackets are eliminated that tend to loosen over time. Another benefit is that the underside of the pressure washer apparatus 10 is protected by the cart 11 from contamination and wear from road debris, such as stones, mud and water. Another benefit is that its outward extending rigid sides 17 protect the washer apparatus 10 from side impacts.

The folded structure is comprised of a horizontal platform wall portion 12 that supports the pressure washer apparatus 10, a pair of folded, downward extending side wall portions 13, a folded upward extending front wall portion 14 and a folded upward extending rear wall portion 15.

Figures 5, 6:
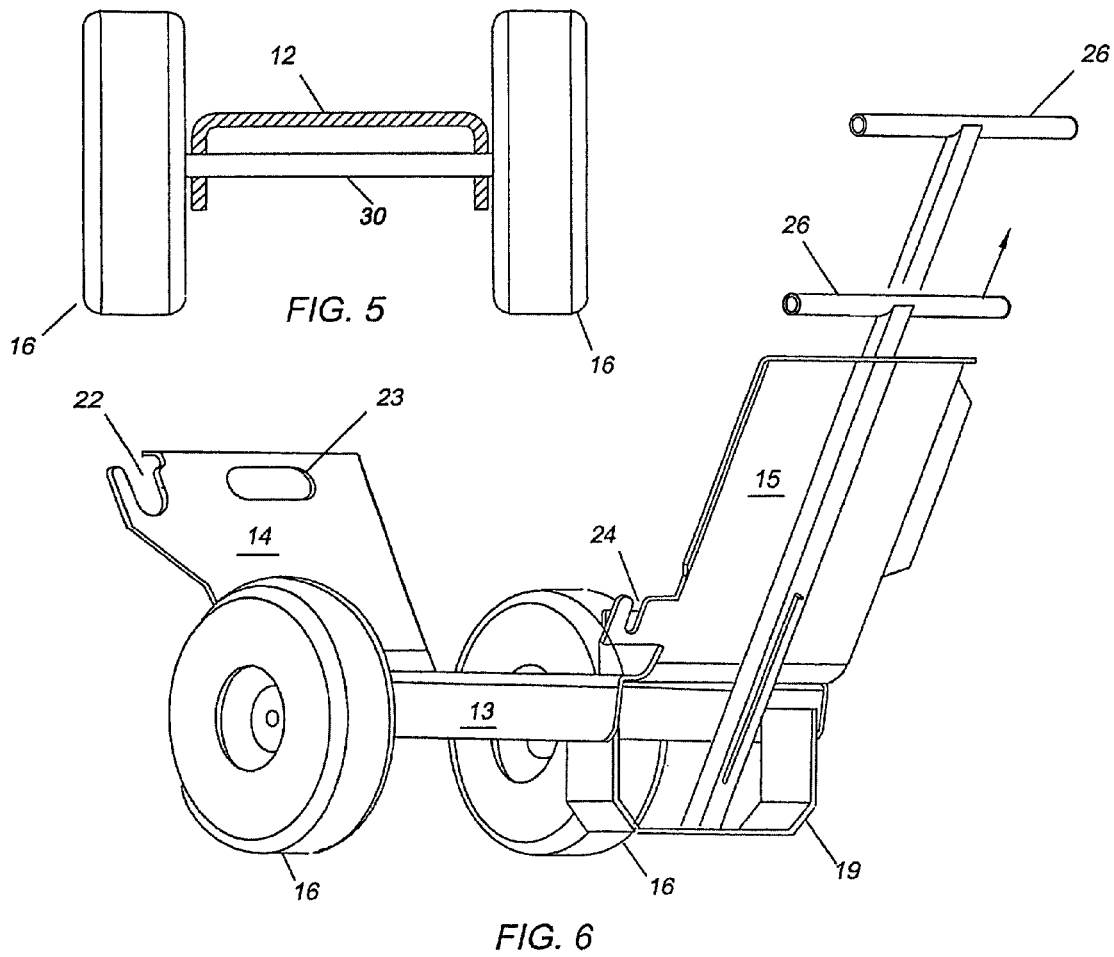
FIG. 5 is a cross-sectional view taken on the line 5-5 in FIG. 3.
FIG. 6 is a perspective view showing the left and rear sides of the cart.

With reference to FIG. 5, at the front of the cart 11, there is a pair of wheels 16 that are rotatably mounted on an axle 30. In the horizontal wall portion 12 are apertures 18 that receive fasteners (not shown) that secure the washer apparatus 10 on the cart 11. At the rear of the cart 11 there is a "U-shaped" pedestal bracket 19 that that is welded to the underside of the cart 11.

The front wall portion 14 has several features. One feature is a plurality of interchangeable nozzle tips 20 that are installed in apertures 21 and a notch 22 that supports a front end portion of the spray wand 25 shown in FIG. 1. Another feature is an aperture 23 in the front wall 14 that serves as a handle for lifting the apparatus 10 and cart 11 over ground obstacles and into vehicles and locking the apparatus to a structure for security.

Figure 7:
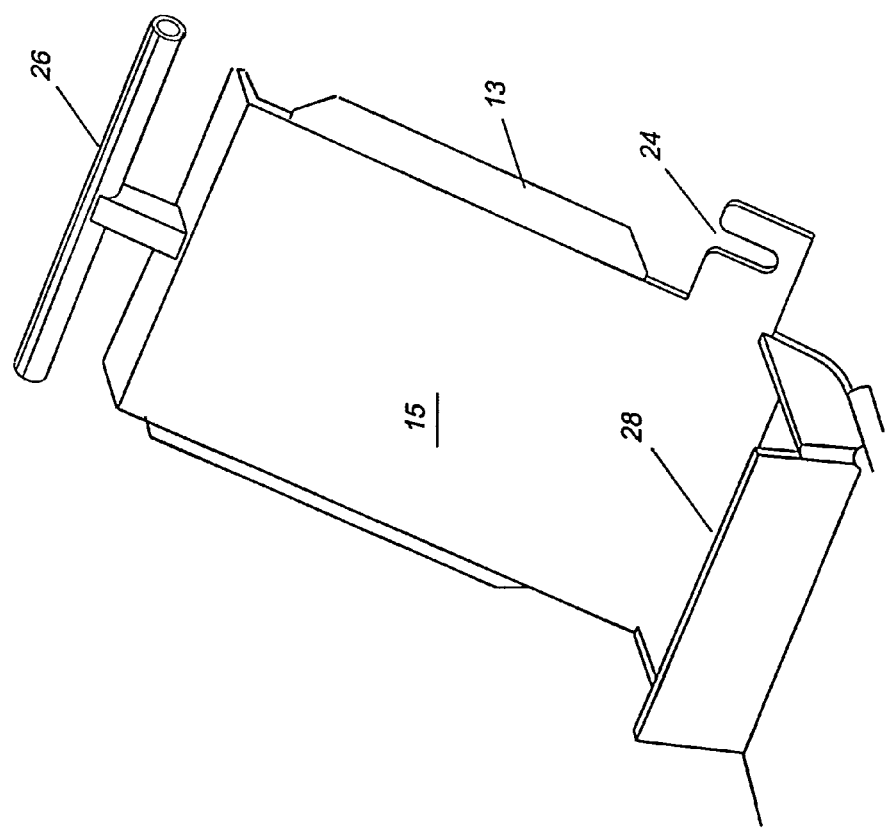
FIG. 7 is a partial perspective view showing a cradle for storing a coiled hose on the cart.

With reference to FIGS. 6 and 7, there are several characterizing features in the rear wall portion 15. One feature is a second notch 24 for supporting the rear end portion of the spray wand 25. Another feature is a T-handle 26 that is telescopically mounted on the outer side of the rear wall portion 15. The telescoping handle 26 is used with the lifting aperture 23 of the front wall portion for transporting washing apparatus 10 and lifting it into a passenger car trunk, van, SUV or pick-up truck. In FIG. 7 a cradle 28 is shown for carrying the hose 27 of FIG. 1 on the cart 11.

Figure 8:
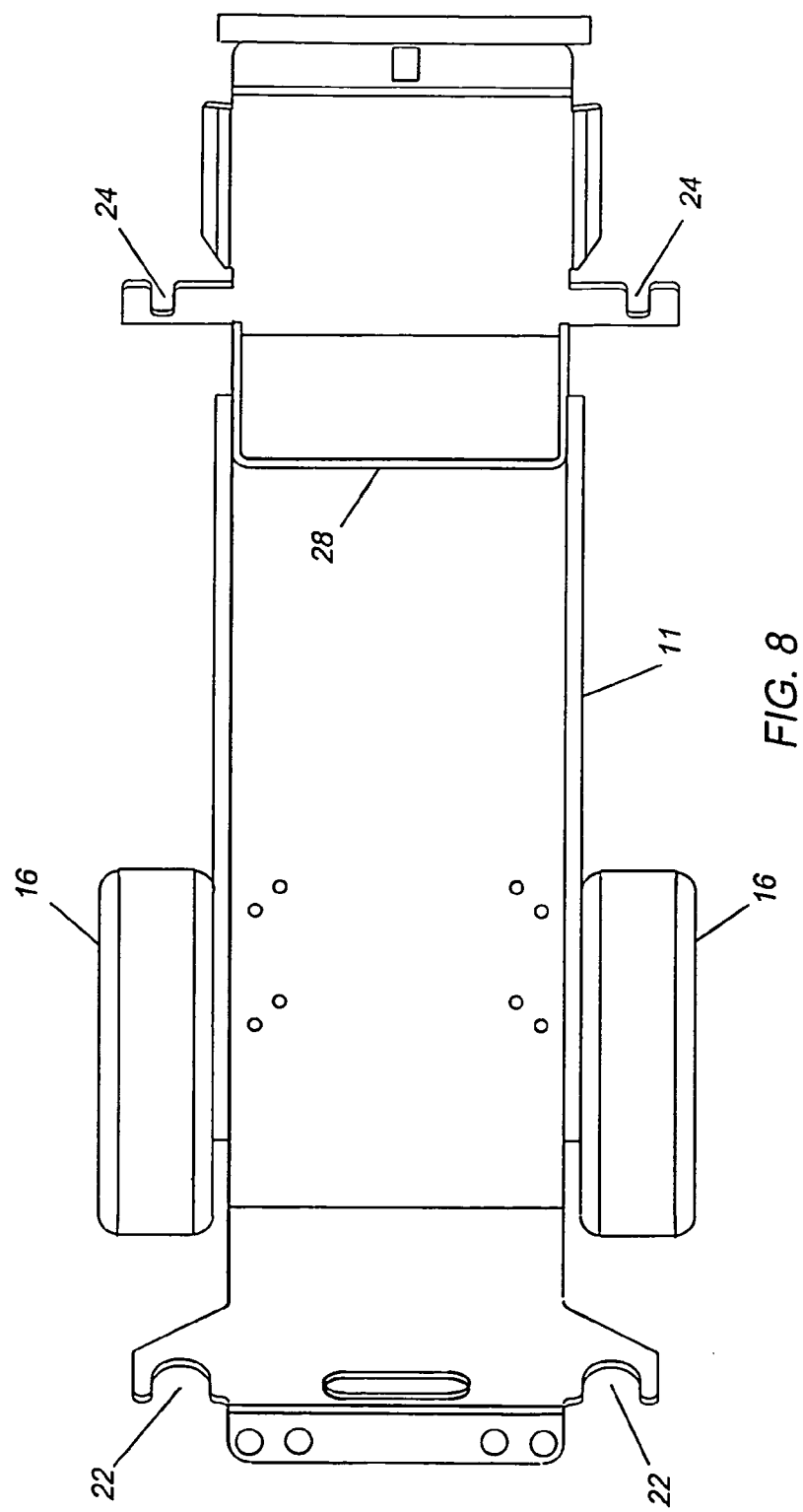
FIG. 8 is a plan view of an alternate embodiment of the cart.

With reference to FIG. 8, an alternate embodiment is shown wherein two pairs of notches (22,24) are provided for supporting a pair of spray wands.

From the foregoing it is apparent that our invention provides an attractive high pressure washer system having advantages over the prior art. The washer system includes a unique rigid lightweight cart structure made from a continuous folded aluminum plate. The folded structure is resistant to corrosion, does not contain fasteners, such as bolts and rivets that tend to loosen, protects engines and pumps from impact forces and includes "built-in" provisions for carrying accessories.

Although only a pair of embodiments have been illustrated and described, it is understood that other embodiments can be derived with obvious changes, such as changes in shape, arrangement, addition, elimination and inversion of parts without departing from the spirit thereof.

What we claim is:

1. The combination of a high pressure power washer apparatus and a mobile cart for transporting said washer apparatus from location to location, said cart comprising a continuous unitary folded plate structure, said unitary folded plate structure having a horizontal wall platform portion for supporting said washer apparatus; a pair of folded side wall portions extending downwardly from outer side edges of said horizontal wall platform portion; a cradle on said horizontal wall platform portion for carrying a hose; a folded front wall portion inclined upwardly from a front edge of said horizontal wall platform portion, said front wall portion having an aperture that serves as a handle for lifting said apparatus and a forward extending portion with a series of small apertures for storing spare nozzle spare tips; a folded rear wall portion inclined upwardly from a rear edge of said horizontal wall platform portion, said rear wall portion having a pair of folded side wall portions extending downwardly from outer side edges of said rear wall portion; a U-shaped pedestal bracket extending downwardly from said an underside of said horizontal wall platform portion; a pair of wheels rotatably mounted on an axle attached to said horizontal wall platform portion; and an axle attached to said horizontal platform wall portion for rotatably mounting said pair of wheels.

2. The combination recited in claim 1 wherein said continuous folded structure is a lightweight aluminum plate structure.

3. The combination recited in claim 2 wherein said folded lightweight aluminum plate structure is a powder coated structure.

4. The combination recited in claim 1 further comprising a "T" shaped handle attached to said rear wall portion for pushing and pulling said cart.

5. The combination recited in claim 3 wherein said handle is telescopically mounted on said rear wall portion for accommodating height differences in users for lifting said cart.

6. The combination recited in claim 1 further comprising a plurality of replaceable spray nozzle tips in said apertures of said folded front wall portion.

7. The combination recited in claim 1 further comprising a notch in said front wall portion for supporting a front portion of a spray wand.

8. The combination recited in claim 7 further comprising a notch in said rear wall portion for supporting a rear portion of said spray wand.

9. The combination recited in claim 8 further comprising said spray wand supported in said notch of said front wall portion and said notch of said rear wall portion.

10. The combination recited in claim 1 further comprising an aperture in said front wall portion for lifting said pressure washer apparatus and cart.

11. The combination recited in claim 7 further comprising a second notch in said front wall portion and a second notch in said rear wall portion for supporting a second spray wand.

12. In a pressure washer system of the type wherein an engine and pump are mounted on a mobile cart, the improvement comprising, a cart consisting essentially of a unitary folded continuous plate structure having a horizontal platform wall portion for supporting a pressure washer apparatus said horizontal platform wall portion having a pair of folded downward extending side wall portions; a folded upward extending inclined front wall portion; and a folded upward extending inclined rear wall portion said rear wall portion having a pair of folded downward extending side wall portions; a cradle on said horizontal platform wall portion for storing a hose; a telescoping T-handle for transporting and lifting said mobile cart; a U-shaped pedestal bracket extending downwardly from said an underside of said horizontal wall platform portion; a pair of wheels rotatably attached to said folded cart structure; and an axle attached to said folded cart structure for rotatably mounting said wheels.

13. A high pressure washer system comprised of a high pressure washer apparatus and a cart for transporting said washer apparatus from location to location, said cart comprised of a unitary continuous folded plate less structure having a horizontal platform portion for supporting said pressure washer apparatus, said horizontal wall platform portion having a pair of downward folded extending side wall portions; an upwardly inclined front wall portion, said front wall portion having an aperture for lifting said washer apparatus and apertures for storing spare spray nozzle tips; an upwardly inclined rear wall portion; a pair of notches in said front and rear wall portions for carrying a spray wand; a spray wand carried by said notches; a pair of wheels rotatably attached to said cart and a handle telescopically mounted to said rear wall portion for pushing and pulling said cart.

* * * * *